US009555495B2

(12) United States Patent
Meckler

(10) Patent No.: US 9,555,495 B2
(45) Date of Patent: Jan. 31, 2017

(54) AUTOMATIC WELDING WIRE FEED ADJUSTER

(75) Inventor: Andreu Preston Meckler, Mentor, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1785 days.

(21) Appl. No.: 11/755,821

(22) Filed: May 31, 2007

(65) Prior Publication Data
US 2008/0296278 A1 Dec. 4, 2008

(51) Int. Cl.
*B23K 9/12* (2006.01)

(52) U.S. Cl.
CPC .................... *B23K 9/124* (2013.01)

(58) Field of Classification Search
CPC ....... B23K 9/124; B23K 9/0956; B23K 9/173; B23K 9/133
USPC ............ 219/137.71, 137.7, 130, 131, 131 F; 226/24, 25, 42, 1, 108, 188; 314/69
See application file for complete search history.

(56) References Cited

U.S. PATENT DOCUMENTS

| 1,927,896 A | * | 9/1933 | Meller ............................ 314/72 |
| 5,053,598 A | * | 10/1991 | Sakai et al. ................. 219/69.12 |
| 5,166,490 A | * | 11/1992 | Morishita et al. ......... 219/69.12 |
| 5,255,836 A | * | 10/1993 | Herber et al. ................... 226/24 |
| 5,738,264 A | | 4/1998 | Jackson et al. |
| 6,236,017 B1 | * | 5/2001 | Smartt et al. ............ 219/130.01 |
| 6,244,930 B1 | | 6/2001 | Archilla |
| 6,388,234 B1 | | 5/2002 | Collins et al. |
| 6,479,793 B1 | | 11/2002 | Wittmann et al. |
| 6,831,251 B1 | | 12/2004 | Artelsmair |
| 2005/0224619 A1 | | 10/2005 | Barea et al. |
| 2008/0257874 A1 | | 10/2008 | Kaufman et al. |

OTHER PUBLICATIONS

Examiner's First Report (Aug. 23, 2010) for Corresponding (AU Application No. 2007354690).
Official Action (Mar. 23, 2011) with English Translation for Correponding Swedish Application (CH Application No. 095043-1).
International Application No. PCT/IB2014/001753, International Search Report & Written Opinion, 8 pages, Apr. 14, 2016.
International Preliminary Report on Patentability and Aug. 22, 2008 Written Opinion of the International Searching Authority in PCT/US2007/015116, Dec. 10, 2009, 10 pages.
International Search Report of the international Searching Authority in PCT/US2007/015116, Aug. 22, 2008, 11 pages.
International Application No. PCT/IB2014/001753, International Search Report & Written Opinion, 10 pages, Mar. 9, 2015.

* cited by examiner

*Primary Examiner* — Jianying Atkisson

(74) *Attorney, Agent, or Firm* — Perkins Coie LLP

(57) ABSTRACT

An automatic wire feed adjuster, including a feeding mechanism including a pair of rollers that feeds a wire therebetween, a tension controller that adjusts a tension between the pair of rollers, a wire speed sensor that measures a fed speed of the wire after exiting the feeding mechanism, and a control circuit that compares a driven speed of the wire with the fed speed of the wire, and that decides whether to instruct the tension controller to adjust the tension between the pair of rollers.

20 Claims, 2 Drawing Sheets

AUTOMATIC WELDING WIRE FEED ADJUSTER

BACKGROUND OF THE INVENTION

1. Field of the Invention

Devices, systems, and methods consistent with the invention relate to an automatic feed adjuster.

2. Description of the Related Art

In the related art, there are various types of welding processes, including processes which utilize a continuous wire feed as a welding electrode.

A diagrammatical representation of such a related art continuous wire feed welding process is illustrated in FIG. 1. In FIG. 1, a welding system 1 includes a control circuit 10, a power source 20, a motor 12, and spool 30. Spool 30 contains wire 35 spooled thereon. Motor 12 drives opposing rollers 14 to take up wire 35 from spool 30 and send it to gun 22. The operator utilizes gun 22 to form a weld on workpiece 40. As the weld is formed on workpiece 40, wire 35 is consumed at gun 22, and is replaced by feeding more wire 35 to gun 22 by action of motor 12 and rollers 14 at a constant rate.

Different types of wires 35 are available for different welding applications. The selection of a particular type of wire depends on several factors, including, e.g., the type of material being welded, the weld design, material surface conditions, quality concerns, and process variation concerns. Due to these considerations, the different types of wires have widely varying diameters.

As mentioned above, in the system illustrated in FIG. 1, wire 35 is fed to gun 22 at a constant rate during a welding operation. This rate is set by the operator via a variable knob on control circuit 10 before the welding operation begins. Different rates are appropriate for different welding applications. For example, a thicker material to be welded may require a faster feed, while a thinner material may require a slower speed to avoid burn-through.

In order to provide the desired feed rate, an amount of tension between rollers 14 is also adjustable by the operator, before the welding operation begins. The term tension is broadly utilized in this context to represent both a "tension" force acting on each roller 14 in a direction toward the other (e.g., as created by a spring member connecting the two rollers 14) and as a "pressure" forcing the rollers 14 toward each other (e.g., as created by spring members on opposite sides of the two rollers 14). This tension between rollers 14 acts to draw wire 35 off of spool 30, and feed wire 35 toward gun 22. The adjustment is typically provided by a small thumb-wheel or other adjustment mechanism.

The tension between rollers 14 is set in view of the diameter of the wire 35, and remains constant during the welding operation. Unfortunately, if the tension between rollers 14 is set too high, the rollers 14 will deform the wire 35 as it passes therethrough. Such a deformed wire 35 can jam gun 22. On the other hand, if the pressure between rollers 14 is set too low, wire 35 will be fed to gun 22 at an erratic rate, which results in an erratic welding arc and poor weld quality.

Further, even if the tension is set properly on a first section of wire 35, there is inherent variability in the diameter of wire 35 due to such factors as manufacturing process variation and/or damage during shipment or storage. In other words, wire 35 may not have a constant diameter along its length. Thus, as wire 35 is fed to gun 22 through rollers 14, the tension set before the welding operation (in view of a beginning diameter of wire 35) might become inappropriate, and wire 35 might begin to deform or be erratically fed, as described above.

The above problems demand an improvement in the related art system.

BRIEF SUMMARY OF THE INVENTION

In one aspect of the invention, there is provided an automatic feed tension adjuster that overcomes the problems of the related art.

In another aspect of the invention, there is provided an automatic wire feed adjuster, including a feeding mechanism comprising a pair of rollers that feeds a wire therebetween, a tension controller that adjusts a tension between the pair of rollers, a control circuit that decides whether to instruct the tension controller to adjust the tension between the pair of rollers.

In another aspect of the invention, there is provided an automatic wire feed adjuster, including a feeding mechanism including a pair of rollers that feeds a wire therebetween, a tension controller that adjusts a tension between the pair of rollers, a wire speed sensor that measures a fed speed of the wire after exiting the feeding mechanism, and a control circuit that compares a driven speed of the wire with the fed speed of the wire, and that decides whether to instruct the tension controller to adjust the tension between the pair of rollers.

In another aspect of the invention, there is provided an automatic wire feed adjuster, including a feeding mechanism for feeding a wire therethrough by applying a force to the wire, a force adjuster that adjusts the force applied to the wire, a control circuit that decides whether to instruct the force adjuster to adjust the force applied to the wire.

In another aspect of the invention, there is provided an automatic wire feed adjuster, including a feeding mechanism for feeding a wire therethrough by applying a force to the wire, a force adjuster that adjusts the force applied to the wire, a wire speed sensor that measures a fed speed of the wire after exiting the feeding mechanism, and a control circuit that compares a driven speed of the wire with the fed speed of the wire, and that decides whether to instruct the force adjuster to adjust the force applied to the wire.

In another aspect of the invention, there is provided a method of adjusting a wire feed, including feeding a wire through a driven pair of rollers having a tension therebetween, measuring a fed speed of the wire after it exits from between the pair of rollers, and deciding whether to adjust the tension between the pair of rollers.

In another aspect of the invention, there is provided a method of adjusting a wire feed, including feeding a wire through a driven pair of rollers having a tension therebetween, measuring a fed speed of the wire after it exits from between the pair of rollers, comparing a driven speed of the wire with the fed speed of the wire, and deciding whether to adjust the tension between the pair of rollers.

In another aspect of the invention, there is provided a method of adjusting a wire feed, including feeding a wire through a feeding mechanism that applies a force to the wire, measuring a fed speed of the wire after it exits from the feeding mechanism, and deciding whether to adjust the force applied to the wire.

In another aspect of the invention, there is provided a method of adjusting a wire feed, including feeding a wire through a feeding mechanism that applies a force to the wire, measuring a fed speed of the wire after it exits from the feeding mechanism, comparing a driven speed of the wire with the fed speed of the wire, and deciding whether to adjust the force applied to the wire.

In another aspect of the invention, there is provided a control circuit that decides whether to instruct a tension controller to adjust a tension between a pair of rollers in a feeding mechanism that feeds a wire therebetween.

In another aspect of the invention, there is provided a tension controller that adjusts a tension between a pair of rollers in a feeding mechanism that feeds a wire therebetween in view of a comparison of a driven speed of the wire determined from the pair of rollers with the fed speed of the wire measured on the wire.

The above stated aspects, as well as other aspects, features and advantages of the invention will become clear to those skilled in the art upon review of the following description.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
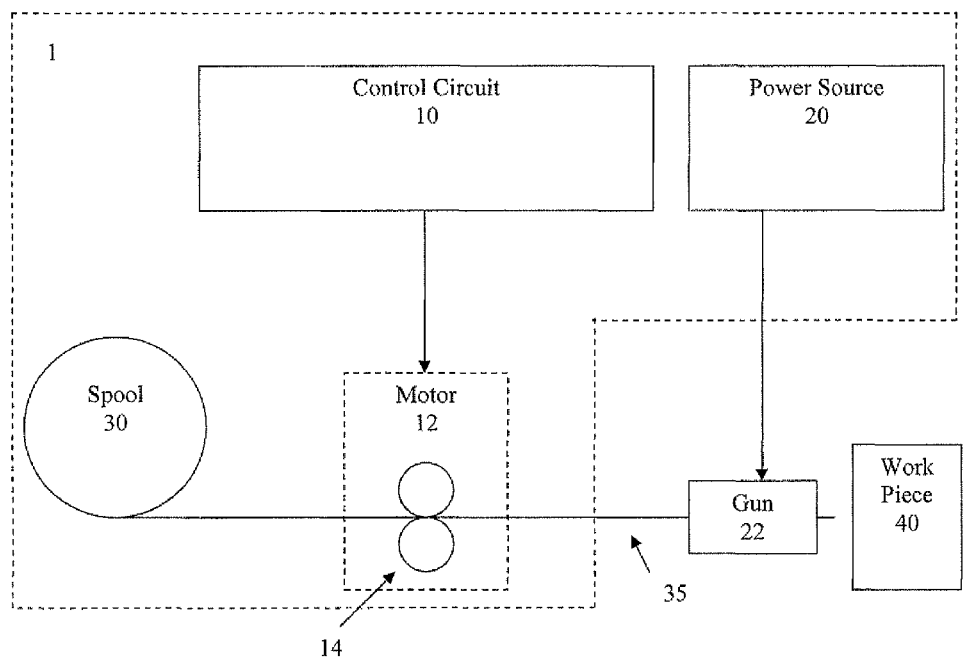
FIG. 1 illustrates a diagrammatic representation of a welding system according to the related art.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

In an exemplary embodiment of the invention, an automatic feed adjuster is utilized to provide optimized wire feeding and welding.

Figure 2:
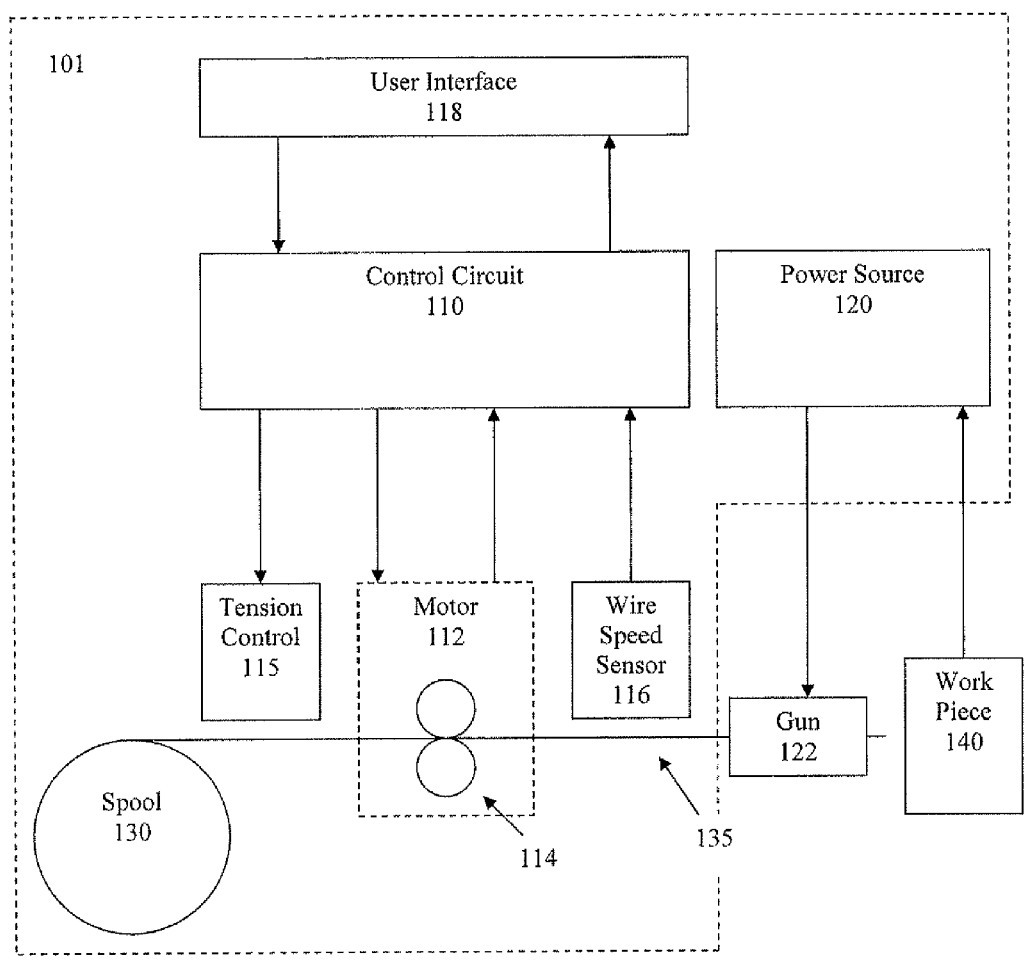
FIG. 2 illustrates a diagrammatic representation of a welding system according to an embodiment of the invention.

More specifically, as shown in FIG. 2, welding system 101 includes control circuit 110, power source 120, motor 112, tension control 115, wire speed sensor 116, user/data interface 118, and spool 130. Spool 130 contains wire 135 spooled thereon. Motor 112 drives opposing rollers 114 to take up wire 135 from spool 130 and send it to gun 122. The operator utilizes gun 122 to form a weld on workpiece 140. As the weld is formed on workpiece 140, wire 135 is consumed, and is replaced by motor 112.

User/data interface 118 provides an input for data regarding wire 135 to be entered into welding system 101. This wire data may include any particular information regarding the wire 135, such as its diameter, length, configuration, manufacturer part number, internal part number, or any other physical, chemical or performance properties that may be useful.

The user/data interface 118 may include, without limitation, any digital, analog, or manual device whereby an operator can enter wire data (e.g., a Graphical User Interface, a text based input system, adjustment knobs, sliders, etc.) or any device that reads wire data from wire 135 or its packaging (e.g., a RFID) reader, magnetic or optical drive, bar code reader, etc.). Further, data regarding wire 135 may also be stored within welding system 101 for later use (or pre-stored before use), and simply be accessed by the operator through user/data interface 118.

Welding system 101 then utilizes wire data for wire 135 to initially adjust, and continuously control, the tension between rollers 114 (via tension control 115). More specifically, tension control 115 first adjusts the tension between rollers 114 to a setting equal to an initial tension that is equal to a minimum amount of tension between rollers 114 necessary to feed wire 135 to gun 122 without slipping. This initial minimum tension is determined according to the wire data (e.g., a diameter) of wire 135. The wire data may be input to welding system 101 as discussed above.

Next, during the welding operation, as wire 135 is fed continuously through rollers 114, the tension control operates to continuously adapt the tension between rollers 114 to maintain a minimum amount of tension between rollers 114 necessary to feed wire 135 to gun 122 without slipping. This operating minimum tension is determined by feedback data delivered to control circuit 110 from motor 112 and wire speed sensor 116, as described below.

The use of these minimum tensions avoids any erratic feeding of the wire 135 due to a tension that is set too low, and any possible deformation of the wire 135 due to a tension that is set too high. Further, as tension adjustments are accomplished automatically by tension control 115, the possibility of operator error influencing the feeding of wire 135 is drastically reduced.

As mentioned above, the operating minimum tension is determined by feedback data. More specifically, when the welding system 101 is feeding wire 135 via motor 112 and opposing rollers 114, the control circuit 110 obtains a first wire speed of the wire 135 by measuring the speed of the motor 112 and taking into account the diameters of rollers 114. Additionally, the control circuit 110 obtains a second wire speed from wire speed sensor 116, which directly measures the speed of wire 135 as it passes thereby. Control circuit 110 then compares the first and second wire speeds. If the wire speeds are the same, no slipping of wire 135 on opposing rollers 114 is occurring, and no tension adjustment is necessary. Thus, the control circuit 110 does not instruct the tension control 115 to modify the tension of rollers 114.

However, if the first wire speed calculated from the motor speed is higher than the second wire speed read from the wire sensor 118, the wire 135 is slipping on opposing rollers 114. Thus, control circuit 110 will instruct the tension control 115 to increase the tension between opposing rollers 114 until the first and second wire speeds become equivalent (i.e., until the wire 135 stops slipping).

Control circuit 110 will continue to increase the tension between opposing rollers 114 until it reaches a maximum value. The maximum value may be set in view of many factors, including a point at which the wire 135 will begin to deform because of the tension. This maximum value is determined according to the wire data (e.g., a diameter, type, size, etc.) of wire 135.

The sampling rate for determining the first and second wire speed is not limited, but should be set to optimize the welding operation.

The wire speed sensor can be any sensor that is capable of providing the required wire speed data, including, without limitation, electronic or mechanical sensors that contact or do not contact the wire 135. While the wire speed sensor in FIG. 2 is positioned after rollers 114, since the wire is continuous, the speed sensor can be placed at any point along the length of wire 135.

Opposing rollers 114 are illustrated in this exemplary embodiment. However, opposing rollers are not required, and the invention is not limited thereto. For example, the invention is equally applicable to system having more or less than two rollers, or to systems that use other driving concepts for wire 135 that create some kind of pressure on the wire. This pressure can be adjusted similarly to the tension described in the exemplary embodiment.

Further, there is no limitation to the amount of rollers 114 that are powered by motor 112. For example, one roller of the rollers 114 may be powered, and one roller may be an unpowered following roller.

The term tension is broadly used in the context of this invention. It means either a "tension" force acting on each roller in a direction toward the other and as a "pressure" forcing the rollers toward each other. This tension can be created by spring members, elastic members, levers, electric motors, or any other such device. The amount of tension is adjustable by adjusting the pressure or tension exerted by these devices, which in turn adjusts the tension between the opposing rollers. The amount of pressure or tension exerted by the devices can be controlled by the tension control 115, or other such component, via electrical or mechanical means.

As mentioned above, the exemplary embodiment utilizes wire data to set an initial tension equal to a minimum amount of tension between rollers 114. However, the invention is not limited thereto, and the initial tension may be set at a point between the minimum and maximum tension. Thereafter, the tension control may operate to reduce the tension until the feedback data indicates that there is slipping of the wire, at which point tension may again be increased according to the process described above.

Although FIG. 2 illustrates a single welding system 101 including spool 130, motor 112, opposing rollers 114, tension controller 116 and wire speed sensor 118, each of these elements may be independently provided, or grouped together in any desirable combination. For example, the roller 114 may be removably attached to a welding machine, located close to the machine, or built into the machine, depending on a particular manufacturer's style and type of machine. Further, the invention may be retrofitted to existing welding systems by adding the necessary components.

The welding system described herein is applicable to any welding system that utilizes a wire feed.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. An automatic wire feed adjuster, comprising:
   a feeding mechanism comprising a motor defining a motor speed and a pair of rollers that feeds a wire therebetween, each roller defining a roller diameter;
   a tension controller that adjusts a tension between the pair of rollers;
   a control circuit that decides whether to instruct the tension controller to adjust the tension between the pair of rollers based on a comparison of a first speed of the wire and a second speed of the wire, the first speed being calculated based upon the motor speed and the roller diameter of at least one of the rollers, the second speed of the wire being directly measured by a wire speed sensor as the wire passes the wire speed sensor.

2. An automatic wire feed adjuster, comprising:
   a feeding mechanism comprising a motor defining a motor speed and a pair of rollers that feeds a wire therebetween, each roller defining a roller diameter;
   a tension controller that adjusts a tension between the pair of rollers;
   a wire speed sensor that directly measures a fed speed of the wire after exiting the feeding mechanism; and
   a control circuit that compares a driven speed of the wire with the fed speed of the wire, and that decides whether to instruct the tension controller to adjust the tension between the pair of rollers, the driven speed being defined by the motor speed and the roller diameter of at least one of the pair of rollers.

3. The automatic wire feed adjuster recited in claim 2, wherein the driven speed of the wire is calculated by taking into account the rotational speed of the at least one of the pair of rollers.

4. The automatic wire feed adjuster recited in claim 2, wherein the control circuit increases the tension between the pair of rollers when the driven speed of the wire is greater than the fed speed of the wire.

5. The automatic wire feed adjuster recited in claim 2, further comprising a user interface for accepting wire data, wherein:
   the wire data comprises a wire diameter; and
   the control circuit determines an initial tension between the pair of rollers, and a maximum tension between the pair of rollers, in view of the wire data.

6. An automatic wire feed adjuster, comprising:
   a feeding mechanism having a motor for feeding a wire therethrough by applying a force to the wire;
   a force adjuster that adjusts the force applied to the wire; and
   a control circuit that decides whether to instruct the force adjuster to adjust the force applied to the wire based on a comparison of a determined speed of the wire determined from feedback data from the motor and a measured speed of the wire.

7. An automatic wire feed adjuster, comprising:
   a feeding mechanism having a motor for feeding a wire therethrough by applying a force to the wire;
   a force adjuster that adjusts the force applied to the wire;
   a wire speed sensor that measures a fed speed of the wire after exiting the feeding mechanism; and
   a control circuit that compares a driven speed of the wire with the fed speed of the wire, and that decides whether to instruct the force adjuster to adjust the force applied to the wire, the driven speed being determined by feedback data from the motor.

8. The automatic wire feed adjuster recited in claim 7, wherein the driven speed of the wire is the speed of the wire within the feeding mechanism.

9. The automatic wire feed adjuster recited in claim 7, wherein the control circuit increases the force applied to the wire when the driven speed of the wire is greater than the fed speed of the wire.

10. The automatic wire feed adjuster recited in claim 7, further comprising a user interface for accepting wire data, wherein:
    the wire data comprises a wire diameter; and
    the control circuit determines an initial pressure applied to the wire, and a maximum pressure applied to the wire, in view of the wire data.

11. A method of adjusting a wire feed, comprising:
    feeding a wire at a first wire speed through a driven pair of rollers having a tension therebetween;
    directly measuring a second speed of the wire after it exits from between the pair of rollers;
    deciding whether to adjust the tension between the pair of rollers based on a comparison of the first and second speeds, wherein the deciding includes determining the first wire speed by measuring a motor speed of a motor driving the pair of rollers and accounting for a diameter of at least one of the rollers.

12. A method of adjusting a wire feed, comprising:

feeding a wire through a driven pair of rollers having a tension therebetween;

directly measuring a fed speed of the wire after it exits from between the pair of rollers;

comparing a driven speed of the wire with the fed speed of the wire; and deciding whether to adjust the tension between the pair of rollers, including determining the driven wire speed by measuring a motor speed of a motor driving the pair of rollers and accounting for a diameter of at least one of the rollers.

13. The method of adjusting a wire feed recited in claim 12, further comprising calculating the driven speed of the wire by taking into account the rotational speed of the at least one of the pair of rollers.

14. The method of adjusting a wire feed recited in claim 12, further comprising increasing the tension between the pair of rollers when the driven speed of the wire is greater than the fed speed of the wire.

15. The method of adjusting a wire feed recited in claim 12, further comprising:

entering wire data via a user interface, wherein the wire data comprises a wire diameter; and determining an initial tension between the pair of rollers, and a maximum tension between the pair of rollers, in view of the wire data.

16. A method of adjusting a wire feed, comprising:

determining a first wire speed through a feeding mechanism that applies a force to the wire by feedback data from the feeding mechanism;

directly measuring a second speed of the wire after it exits from the feeding mechanism; and comparing the first and second speeds.

17. A method of adjusting a wire feed, comprising:

feeding a wire through a feeding mechanism that applies a force to the wire;

directly measuring a fed speed of the wire after it exits from the feeding mechanism;

comparing a driven speed of the wire with the fed speed of the wire, including determining the driven speed by feedback data from the feeding mechanism; and deciding whether to adjust the force applied to the wire.

18. The method of adjusting a wire feed recited in claim 17, wherein the determining the driven speed by feedback data comprises calculating the driven speed of the wire inside the feeding mechanism by measuring a motor speed of the feeding mechanism and accounting for a diameter of a roller of the feeding mechanism.

19. The method of adjusting a wire feed recited in claim 17, further comprising increasing the force applied to the wire when the driven speed of the wire is greater than the fed speed of the wire.

20. The method of adjusting a wire feed recited in claim 17, further comprising:

entering wire data via a user interface, wherein the wire data comprises a wire diameter; and determining an initial force applied to the wire, and a maximum force applied to the wire, in view of the wire data.

* * * * *